(12) United States Patent
Kuwata et al.

(10) Patent No.: US 7,657,440 B2
(45) Date of Patent: Feb. 2, 2010

(54) FISHING GEAR MAINTENANCE COST ESTIMATION SYSTEM AND FISHING GEAR MAINTENANCE COST ESTIMATION PROGRAM

(75) Inventors: Junichi Kuwata, Sakai (JP); Takuro Yamane, Sakai (JP)

(73) Assignee: Shimano Inc., Osaka (JP)

( * ) Notice: Subject to any disclaimer, the term of this patent is extended or adjusted under 35 U.S.C. 154(b) by 291 days.

(21) Appl. No.: 11/429,230

(22) Filed: May 8, 2006

(65) Prior Publication Data
US 2006/0253298 A1 Nov. 9, 2006

(30) Foreign Application Priority Data
May 9, 2005 (JP) .............................. 2005-136384

(51) Int. Cl.
G06Q 10/00 (2006.01)
G06F 17/00 (2006.01)
G06G 7/00 (2006.01)

(52) U.S. Cl. .......................................... 705/1; 705/400

(58) Field of Classification Search ........................ None
See application file for complete search history.

(56) References Cited

U.S. PATENT DOCUMENTS

| | | | | | |
|---|---|---|---|---|---|
| 4,585,182 | A | * | 4/1986 | Atobe | 242/223 |
| 6,429,810 | B1 | * | 8/2002 | De Roche | 342/357.07 |
| 2001/0032109 | A1 | * | 10/2001 | Gonyea et al. | 705/8 |
| 2003/0061076 | A1 | * | 3/2003 | Okuyama et al. | 705/4 |
| 2006/0053028 | A1 | * | 3/2006 | Congel | 705/1 |

FOREIGN PATENT DOCUMENTS

| | | | |
|---|---|---|---|
| EP | 1 205 407 A1 | 5/2002 |
| EP | 1 271 375 A2 | 1/2003 |
| EP | 1 380 979 A1 | 1/2004 |
| WO | WO-00/57304 A1 | 9/2000 |
| WO | WO-01/50377 A2 | 7/2001 |

OTHER PUBLICATIONS

Oldinlet.com, "Rod and Reel Repair" Dec. 19, 2005, published by Oldinlet.com, http://web.archive.org/web/20051219102716/www.oldinlet.com/sales/repair.html and http://web.archive.org/web/20051119224934/www.oldinlet.com/sales/workorder.html retrieved Nov. 11, 2009.*
Bish & Fish in New Zealand; "Fishing Hints, Tips, Tricks and How-To's"; Tony Bishop 1996-2008.
Bish & Fish in New Zealand; "Twist and Shout", Tony Bishop 1996-2008.

* cited by examiner

Primary Examiner—John W Hayes
Assistant Examiner—George Chen
(74) Attorney, Agent, or Firm—Global IP Counselors, LLP

(57) ABSTRACT

A fishing gear maintenance cost estimation system uses a fishing gear maintenance cost estimation program to estimate cost of maintenance of fishing gear. The fishing gear maintenance cost estimation system has an information acceptance component, a replacement part determination component, a cost computation component and a display. The information acceptance component accepts estimation basis information including product information and condition information. The product information is information for identifying a product name of fishing gear. The condition information is information for identifying condition of the fishing gear. The replacement part determination component determines a part which must be replaced on the basis of the estimation basis information. The cost computation component computes the overhaul cost including the cost of the part. The display displays the overhaul cost.

17 Claims, 12 Drawing Sheets

Fig. 2

ESTIMATION OF OVERHAUL FEE

PLEASE ANSWER QUESTIONS ABOUT YOUR REEL

OPERATING PROCEDURE

1. PLEASE CLICK ONE OF REEL MODEL IN LEFT FRAME.
2. PLEASE CLICK PRODUCT NAME OR ABBREVIATED CODE
3. PLEASE CLICK NUMBER FOR PATTERN CLOSEST TO YOUR REEL CONDITION FROM CONDITION PATTERN TABLE
4. RESULTING ESTIMATE IS DISPLAYED. IF YOU THINK IT'S REASONABLE, PLEASE PRINT OUT THE ESTIMATE AFTER INPUTTING YOUR NAME AND PRODUCT NAME, AND THEN HAND OVER THE ESTIMATE AND YOUR REEL TO NEAREST SHIMANO DISTRIBUTION AGENT.

| NAMES OF PRODUCTS UNDER ESTIMATION SPINNING REELS | ABBREVIATED CODE |
|---|---|
| 04NAVI 1000 | 01874 |
| 03NAVI 1500 | 01653 |
| 03NAVI 2000 | 01654 |
| 03NAVI 2500 | 01655 |
| 03NAVI C3000 | 01835 |
| 03NAVI 3000 | 01656 |
| 03NAVI 4000 | 01657 |
| 03NAVI 5000 | 01658 |
| 03NAVI 6000 | 01730 |
| 03NAVI 8000 | 01731 |
| 02NAVI 6000PG | 01599 |
| 02NAVI 6000PG(ARB) | 01600 |
| 02NAVI 8000PG | 01733 |
| 02NAVI 8000PG(ARB) | 01562 |
| 01NAVI 2500L | 01563 |
| 01NAVI 3000L | 01564 |
| 01NAVI 4000L | 01519 |
| 01NAVI 1000 | 01520 |
| 00NAVI 2000 | 01521 |
| 00NAVI 2500 | 01522 |
| 00NAVI 3000 | 01523 |
| 00NAVI 4000 | 01524 |
| 00NAVI 5000 | 01525 |
| 00NAVI 6000 | 01458 |
| 99NAVI 1000 | 01424 |
| 99NAVI 2000 | 01425 |
| 99NAVI 2500 | 01426 |
| 99NAVI 3000 | 01427 |
| 99NAVI 4000 | 01428 |
| 99NAVI 5000 | 01429 |
| 99NAVI 6000 | 01188 |
| NAVI 500XT | |

| PRODUCT SERIES UNDER ESTIMATION |
|---|
| SPINNING REELS |
| STELLA |
| TWINPOWER |
| SENSILITE |
| BIOMASTER |
| ULTEGRA |
| NAVI |
| AERLEX |
| AERNOS |
| APELT |
| ALIVIO |
| ACOLT |
| SUPER AERO |
| POWER AERO |
| BAITCASTING REELS |
| DENDOU-MARU |
| KOBUNE SLS |
| SLS MADAI |
| SLS LEVERDRAG |
| CONQUEST FUNE |
| CALCUTTA |
| AXIS |
| SUPER KOBUNE·FUNE |
| TITANOS·KOBUNE·FUNE |
| TANATOL·TITANOS·FUNE |
| TIAGRA |
| ANTARES |
| METANIUM |
| SCORPION |
| FREESTONE |

Fig. 3

| NAMES OF PRODUCTS UNDER ESTIMATION | ABBREVIATED CODE |
|---|---|
| SPINNING REELS | |
| 04NAVI 1000 | 01874 |
| 03NAVI 1500 | 01653 |
| 03NAVI 2000 | 01654 |
| 03NAVI 2500 | 01655 |
| 03NAVI C3000 | 01835 |
| 03NAVI 3000 | 01656 |
| 03NAVI 4000 | 01657 |
| 03NAVI 5000 | 01658 |
| 03NAVI 6000 | 01730 |
| 03NAVI 8000 | 01731 |
| 02NAVI 6000PG | 01599 |
| 02NAVI 6000PG(ARB) | 01599 |
| 02NAVI 8000PG | 01600 |
| 02NAVI 8000PG(ARB) | 01733 |
| 01NAVI 2500L | 01562 |
| 01NAVI 3000L | 01563 |
| 01NAVI 4000L | 01564 |
| 00NAVI 1000 | 01519 |
| 00NAVI 2000 | 01520 |
| 00NAVI 2500 | 01521 |
| 00NAVI 3000 | 01522 |
| 00NAVI 4000 | 01523 |
| 00NAVI 5000 | 01524 |
| 00NAVI 6000 | 01525 |
| 99NAVI 1000 | 01458 |
| 99NAVI 2000 | 01424 |
| 99NAVI 2500 | 01425 |
| 99NAVI 3000 | 01426 |
| 99NAVI 4000 | 01427 |
| 99NAVI 5000 | 01428 |
| 99NAVI 6000 | 01429 |
| NAVI 500XT | 01188 |

Fig. 4

| PLEASE ANSWER QUESTIONS ABOUT YOUR REEL | | | | | | | | | | | | | | |
|---|---|---|---|---|---|---|---|---|---|---|---|---|---|---|
| Q0 FEELING THAT THERE ARE NO PARTS TO BE REPLACED. | ◎ | | | | | | | | | | | | | |
| Q1 HANDLE CANNOT BE ROTATED AT ALL. | | ◎ | | | | | | | | | | | | |
| Q2 RESISTANCE TO ROTATION IS FELT DURING ROTATION OF HANDLE. | | | ◎ | | | | | | | | | | | |
| Q3 RUMPLING SOUND UNUSUAL STRONG ENOUGH TO BE FELT BY THE HAND DURING ROTATION OF HANDLE | | | | ◎ | | | | | | ◎ | | | | |
| Q4 WHEN LEVEL WIND IS MOVED TO LEFT AND RIGHT, STATE OF BEING CAUGHT IS FELT AT THE TIME OF TURNING AT LEFT OR RIGHT END. | | | | | ◎ | | | | | | | | | ◎ |
| Q5 FREE ROTATION OF SPOOL IS NOT SMOOTH. | | | | | | ◎ | | | | ◎ | ◎ | ◎ | | |
| Q6 STOPPER DOES NOT WORK WELL. | | | | | | | ◎ | | | | | | | |
| Q7 REVERSE ROTATION OF HANDLE SOMETIMES OCCURS WHEN HANDLE IS ROTATED. | | | | | | | | ◎ | | ◎ | | | ◎ | ◎ |
| Q8 LINE PAYS OUT EVEN WHEN START DRAG IS FULLY TURNED ON. | | | | | | | | | ◎ | | | | | |
| Q9 JERKING SOMETIMES OCCURS DEPENDING ON DRAG ADJUSTMENT OF START DRAG. | | | | | | | | | | | ◎ | ◎ | ◎ | ◎ |
| PLEASE CLICK NUMBER FOR CONDITION PATTERN CORRESPONDING TO CONDITION OF YOUR ITEM. | 0 | 1 | 2 | 3 | 4 | 5 | 6 | 7 | 8 | 9 | 10 | 11 | 12 | 13 |

| REPLACEMENT PARTS ASSOCIATION TABLE 01STELLAFW2500S | ROLLER CLUTCH | ARM ROLLER BEARING | MASTER GEAR BEARING | PINION GEAR BEARING | MASTER GEAR | PINION GEAR | CROSS GEAR SHAFT | GEAR FOR CROSS GEAR | CROSS GEAR PIN | INTERMEDIATE GEAR | PINION GEAR WORM | DRAG WASHER |
|---|---|---|---|---|---|---|---|---|---|---|---|---|
| PART UNIT PRICE | 1,000 | 600 | 600 | 600 | 2,000 | 1,000 | 1,000 | 500 | 300 | 300 | 300 | 100 |
| REEL CONDITION PATTERNS | | | | | | | | | | | | |
| 1. HANDLE CANNOT BE ROTATED AT ALL. | 1 / 1,000 | --- | 2 / 1,200 | 1 / 600 | 1 / 2,000 | 1 / 1,000 | 1 / 1,000 | 1 / 500 | 1 / 300 | 1 / 300 | 1 / 300 | --- |
| 2. RESISTANCE TO ROTATION IS FELT DURING ROTATION OF HANDLE. | 1 / 1,000 | --- | 2 / 1,200 | 1 / 600 | 1 / 2,000 | 1 / 1,000 | 1 / 1,000 | 1 / 500 | 1 / 300 | --- | --- | --- |
| 3. RUMPLING SOUND UNUSUAL STRONG ENOUGH TO BE FELT BY THE HAND DURING ROTATION OF HANDLE. | 1 / 1,000 | --- | 2 / 1,200 | 1 / 600 | 1 / 2,000 | 1 / 1,000 | 1 / 1,000 | --- | --- | --- | --- | --- |
| 4. FRICTIONAL/CLICKING UNUSUAL SOUND IS GENERATED FROM INSIDE OF ROTARY FRAME DURING ROTATION OF HANDLE. | 1 / 1,000 | --- | --- | --- | --- | 1 / 1,000 | --- | --- | --- | --- | --- | --- |
| 5. STATE OF BEING CAUGHT SOMETIMES OCCURS DURING ROTATION OF HANDLE. WHEN SPOOL IS MOVED UP AND DOWN, RESISTANCE TO ROTATION IS FELT AT THE TIME OF TURNING AT UPPER OR LOWER END OF STROKE. | --- | --- | --- | --- | --- | --- | 1 / 1,000 | 1 / 500 | 1 / 300 | --- | --- | --- |
| 6. ROTATING CONDITION OF LINE ROLLER IS NOT GOOD. LINE TWIST OCCURS WHEN LINE IS LOADED. | --- | 2 / 1,200 | --- | --- | --- | --- | --- | --- | --- | --- | --- | --- |
| 7. SPOOL DRAG ADJUSTMENT IS INEFFECTIVE. JERKING SOMETIMES OCCURS DEPENDING ON SPOOL DRAG ADJUSTMENT. | --- | --- | --- | --- | --- | --- | --- | --- | --- | --- | --- | 1 / 100 |

ESTIMATION OF OVERHAUL FEE

FOR CONFIRMATION, PLEASE INPUT YOUR NAME AND NAME OF ITEM UNDER PRESENT ESTIMATION.
IF OVERHAUL FEE MEETS YOUR WISH, PLEASE HAND OVER YOUR REEL TO NEAREST SHIMANO DISTRIBUTION AGENT.
WE THINK WE CAN MAKE REPAIRS MORE APPROPRIATE TO YOUR NEED IF YOU ATTACH THIS ESTIMATE ALONG WITH REPAIR CLAIM CHECK.

YOUR NAME [         ]

ITEM NAME [ 03NAVI 3000 ▼ ]

| REPLACEMENT PARTS | AMOUNT | UNIT PRICE | PRICE |
|---|---|---|---|
| ROLLER CLUTCH | 1 | 1,000 | 1,000 |
| MASTER GEAR | 1 | 400 | 400 |
| PINION GEAR | 1 | 400 | 400 |
| SLIDER GEAR | 1 | 100 | 100 |
| INTERMEDIATE GEAR | 1 | 100 | 100 |
| PARTS SUBTOTAL | | | 2,000 |
| OVERHAUL WAGE | 1 | 2,000 | 2,000 |
| SUBTOTAL | | | 4,000 |
| SALES TAX | | | 200 |
| OVERHAUL FEE | | | 4,200 |

* IN AMOUNT SECTION, NECESSARY NUMBER OF REPLACEMENT PARTS ARE INDICATED. PARTS THOUGHT TO BE WITHOUT NEED TO REPLACE ARE DENOTED WITH "-".

| PRESENT CONDITION | RESISTANCE TO ROTATION IS FELT DURING ROTATION OF HANDLE. FRICTIONAL/CLICKING UNUSUAL SOUND IS GENERATED FROM INSIDE OF ROTARY FRAME DURING ROTATION OF HANDLE. STATE OF BEING CAUGHT SOMETIMES OCCURS DURING ROTATION OF HANDLE. |
|---|---|

WE HAVE MADE ESTIMATE WITH RESPECT TO THE CONDITION OF YOUR REEL. WE SHOULD MENTION A POSSIBILITY THAT AFTER DISASSEMBLY OF THE ITEM IN THE RECEIVED STATE A FURTHER PART TO BE REPLACED WILL BE FOUND OR, CONVERSELY, NO NEED FOR REPLACEMENT WILL BE RECOGNIZED. IN THE LATTER CASE, ONLY DISASSEMBLY AND ADJUSTMENT WILL SUFFICE. PLEASE NOTE THAT IF NEED FOR AN ADDITIONAL COST IS RECOGNIZED, WE WILL ASK YOU FOR DECISION ON ANOTHER ESTIMATE SENT OUR COMPANY TO YOU.

INQUIRY NUMBER [ 00001 ]

Fig. 7

FISHING GEAR MAINTENANCE COST ESTIMATION SYSTEM AND FISHING GEAR MAINTENANCE COST ESTIMATION PROGRAM

CROSS-REFERENCE TO RELATED APPLICATIONS

This application claims priority under 35 U.S.C. §119 to Japanese Patent Application No. 2005-136384. The entire disclosure of Japanese Patent Application No. 2005-136384 is hereby incorporated herein by reference.

BACKGROUND OF THE INVENTION

1. Field of the Invention

The present invention generally relates to a fishing gear maintenance cost estimation system and to a fishing gear maintenance cost estimation program. More specifically, the present invention relates to a fishing gear maintenance cost estimation system and to a fishing gear maintenance cost estimation program with which the cost of maintenance can be easily and accurately estimated.

2. Background Information

Fishing gear products such as reels having a comparatively complicated structure exist and maintenance services such as overhaul and fault repair of such products are being offered. Such maintenance services are ordinarily performed as described below.

First, a person who orders maintenance (e.g. the owner) of an article brings the article to a distributor, fills in an order form, and hands over the article to the distributor. The product is sent from the distributor to the manufacturer. The manufacturer performs a maintenance operation on the article according to the maintenance form. For example, in the case of overhaul, the article undergoes disassembly, cleaning, inspection, and so on, and a part is replaced if necessary. In the case of failure repair, an examination for ascertaining the cause of a failure and replacement of a part are performed. In either case, the article that has undergone maintenance operations is delivered back to the distributor. The person who orders maintenance (e.g. the owner/orderer) pays for the cost of maintenance to the distributor and receives the article (see non-patent document 1:

A person who orders maintenance as described above usually wants to know the cost necessary for maintenance in advance. However, it is difficult to compute the cost necessary for maintenance of an article before the article is sent to the manufacturer and disassembled, i.e., before the conditions of internal parts are checked by the manufacturer.

Parts price tables and standard technical maintenance fee tables are being made public in catalogs and on internet web pages. However, it is difficult to determine which part will be actually replaced. For example, information for various models of reels are being provided. Different models require different replacement parts of various prices. Therefore, the cost of a maintenance process cannot be easily determined before the completion of the maintenance process, and it is difficult to predict the maintenance cost.

In view of the above, it will be apparent to those skilled in the art from this disclosure that there exists a need for an improved a fishing gear maintenance cost estimation system and to a fishing gear maintenance cost estimation program. This invention addresses this need in the art as well as other needs, which will become apparent to those skilled in the art from this disclosure.

SUMMARY OF THE INVENTION

An object of the present invention is to provide a fishing gear maintenance cost estimation system and a fishing gear maintenance cost estimation program with which the cost of maintenance can be easily and accurately estimated.

According to a first aspect of the present invention, there is provided a fishing gear maintenance cost estimation system having an information acceptance component, a replacement part determination component, a cost computation component and a display device. The information acceptance component accepts, via a Web page read through the Internet, estimation basis information including product information and condition information. The product information is information for identifying a product name of a fishing gear on which maintenance estimation is to be made. The condition information is information for identifying a condition of the fishing gear. The replacement part determination component determines a part which must be replaced on the basis of the estimation basis information. The cost computation component computes a cost of maintenance including the cost of the part. The display device displays the cost of maintenance on the Web page. Alternatively, the display device can be referred to as a "display" herein for the sake of brevity.

In this fishing gear maintenance cost estimation system, product information and condition information are accepted via a Web page and a part which must be replaced is determined on the basis of the product information and the condition information. Therefore the part which must be replaced can be predicted with improved accuracy. The cost of maintenance including the cost of the part is computed and displayed on the Web page. In this way, the cost of maintenance can be easily estimated with improved accuracy.

A fishing gear maintenance cost estimation system according to a second aspect of the present invention is based on the fishing gear maintenance cost estimation system in the first aspect of the present invention. The display in this system displays on a Web page an estimate sheet view containing the product information, the part which must be replaced, and the cost of maintenance.

In this fishing gear maintenance cost estimation system, an estimate sheet view is displayed on the Web page. Therefore a user can use the estimate sheet view on the Web page as an estimate sheet by printing out the estimate sheet view on the Web page.

A fishing gear maintenance cost estimation system according to a third aspect of the present invention is based on the fishing gear maintenance cost estimation system in the first or second aspect of the present invention. The information acceptance component in this system accepts as the condition information a condition pattern selected from a plurality of condition patterns displayed on the Web page to indicate the condition of the product.

In this fishing gear maintenance cost estimation system, a plurality of condition patterns for indicating the condition of the product is displayed on the Web page and the user can therefore select the corresponding condition pattern. The selected condition pattern is accepted as condition information. Ordinarily, different persons use different expressions for one condition of a product. For this reason, processing of the condition information tends to be complicated. In this fishing gear maintenance cost estimation system, however, the corresponding condition is selected from the plurality of condition patterns, so that the condition information can be easily processed.

A fishing gear maintenance cost estimation system according to a fourth aspect of the present invention is based on the fishing gear maintenance cost estimation system in the third aspect of the present invention and further has a storage device. The storage device stores a replacement parts association table containing the product information, the condition patterns and replacement part information indicating parts which must be replaced in correspondence to the condition patterns. The replacement part determination component determines the part which must be replaced, by referring to the replacement parts association table.

In this fishing gear maintenance cost estimation system, the part which must be replaced is determined by referring to the replacement parts association table. Therefore the part which must be replaced can be easily determined.

A fishing gear maintenance cost estimation system according to a fifth aspect of the present invention is based on the fishing gear maintenance cost estimation system in the fourth aspect of the present invention and has a first accumulation component, a maintenance execution information acceptance component, a second accumulation component and a replacement parts association table update component. The first accumulation component accumulates the estimation basis information. The maintenance execution information acceptance component accepts maintenance execution information indicating details of the executed maintenance. The second accumulation component accumulates the maintenance execution information. The replacement parts association table update component updates the replacement parts association table on the basis of the accumulated estimation basis information and the maintenance execution information.

In this fishing gear maintenance cost estimation system, the replacement parts association table is updated on the basis of the accumulated estimation basis information and the maintenance execution information. As a result, the accuracy of determination of the part which must be replaced is further improved.

A fishing gear maintenance cost estimation system according to a sixth aspect of the present invention is based on any of the fishing gear maintenance cost estimation systems in the first to fifth aspects of the present invention. The information acceptance component in this system accepts, through the Web page, store information for identifying a store to which the fishing gear is handed over to receive maintenance. This fishing gear maintenance cost estimation system further has a first scheduled delivery time computation component of computing a scheduled delivery time for delivery of the fishing gear on the basis of the result of determination by the replacement part determination component and the store information. The display displays on the Web page the scheduled delivery time computed by the first scheduled delivery time computation component.

In this fishing gear maintenance cost estimation system, a scheduled delivery time is computed by the first scheduled delivery time computation component and is displayed on the Web page, thereby enabling the user to easily know the scheduled delivery time.

A fishing gear maintenance cost estimation system according to a seventh aspect of the present invention is based on any of the fishing gear maintenance cost estimation systems in the first to sixth aspects of the present invention. The information acceptance component in this system accepts, through the Web page, an acceptance number assigned to the fishing gear when the fishing gear is handed over to the store to receive maintenance. This fishing gear maintenance cost estimation system further has a progress information acceptance component and a second scheduled delivery time computation component. The progress information acceptance component accepts progress information indicating the progress of maintenance of the fishing gear. The second scheduled delivery time computation component computes a scheduled delivery time for delivery of the fishing gear on the basis of the progress information. The display displays on the Web page the scheduled delivery time computed by the second scheduled time computation component with respect to the fishing gear corresponding to the acceptance number accepted by the information acceptance component.

In this fishing gear maintenance cost estimation system, progress information indicating the progress of maintenance of the fishing gear receiving maintenance according to a maintenance order is accepted. The progress information indicates, for example, a situation in which overhaul is not yet executed, a situation in which the gear is on standby for inspection in a quality control department or a situation in which the fishing gear is being delivered after the completion of maintenance. The scheduled delivery time computed by the second scheduled delivery time computation component is displayed on the Web page with respect to the fishing gear corresponding to the acceptance number accepted by the information acceptance component, thereby enabling the user to easily know the scheduled delivery time for delivery of the handed-over fishing gear by inputting the acceptance number through the Web page.

A fishing gear maintenance cost estimation system according to an eighth aspect of the present invention is based on any of the fishing gear maintenance cost estimation systems in the first to seventh aspects of the present invention. The display in this system displays on the Web page a list of optional parts mountable to the fishing gear. The information acceptance component accepts a selection from the optional parts through the Web page. The cost computation component computes the cost of the maintenance including the cost of the selected optional part.

In this fishing gear maintenance cost estimation system, a selection from the optional parts is accepted and the cost of the maintenance including the cost of the selected optional part is computed. Therefore the fishing gear can be easily customized while receiving maintenance.

A fishing gear maintenance cost estimation system according to a ninth aspect of the present invention is based on any of the fishing gear maintenance cost estimation systems in the first to eighth aspects of the present invention. The display in this system displays information as to the existence/nonexistence of a stock of the optional parts as well as the list of the optional parts.

In this fishing gear maintenance cost estimation system, the existence/nonexistence of a stock of the optional parts is displayed on the Web page to enable the user to easily know whether or not the operation to mount the optional part can be immediately executed.

A fishing gear maintenance cost estimation system according to a tenth aspect of the present invention is based on the fishing gear maintenance cost estimation system in the eighth or ninth aspect of the present invention. In this system, if the selected optional part can be used in place of the part determined to be replaced by the replacement part determination component, the display displays information indicating that there is a difference between the cost of maintenance computed by the cost computation component including the cost of the optional part and the overhaul cost in the case where the optional part is used in place of the part to be replaced.

In a case where, in this fishing gear maintenance cost estimation system, the selected optional part can be used in place of the part determined to be replaced by the replacement part determination component, the user can easily know that there is a difference between the cost of maintenance computed by the cost computation component including the cost of the optional part and the overhaul cost when the optional part is used in place of the part to be replaced. The user can therefore easily know the cost to be actually paid when the optional part is selected.

A fishing gear maintenance cost estimation system according to an eleventh aspect of the present invention is based on any of the fishing gear maintenance cost estimation systems in the first to tenth aspects of the present invention. In this system, the fishing gear is a reel.

Reels have an extremely complicated structure among fishing gears. Some reels have a number of parts close to 100 (one-hundred). It is extremely difficult to estimate repair and/or maintenance costs on such reels. According to the present invention, however, it is possible to easily estimate even the cost necessary for maintenance and/or repair of any of such reels.

A fishing gear maintenance cost estimation system according to a twelfth aspect of the present invention is based on any of the fishing gear maintenance cost estimation systems in the first to eleventh aspects of the present invention. In this system, the maintenance is overhaul for maintenance of the fishing gear.

In this fishing gear maintenance cost estimation system, the cost necessary for overhaul of the fishing gear can be easily estimated with accuracy.

A fishing gear maintenance cost estimation system according to a thirteenth aspect of the present invention is based on any of the fishing gear maintenance cost estimation systems in the first to eleventh aspects of the present invention. In this system, the maintenance is repair of the fishing gear out of order.

In this fishing gear maintenance cost estimation system, the cost necessary for repair of the fishing gear can be easily estimated with accuracy.

A fishing gear maintenance cost estimation system according to a fourteenth aspect of the present invention is based on any of the fishing gear maintenance cost estimation systems in the first to thirteenth aspects of the present invention. In this system, the information acceptance component accepts a use period during which the fishing gear is used, and the replacement part determination component determines a part which must be replaced on the basis of the use period.

In this fishing gear maintenance cost estimation system, the part which must be replaced can be determined by considering the fishing gear use period. The amounts of wear of parts depend on the fishing gear use period. Therefore the part which must be replaced can be determined with improved accuracy by considering the use period.

A fishing gear maintenance cost estimation system according to a fifteenth aspect of the present invention is based on any of the fishing gear maintenance cost estimation systems in the first to thirteenth aspects of the present invention. In this system, the information acceptance component accepts the number of times the fishing gear is used, and the replacement part determination component determines a part which must be replaced on the basis of the number of times the fishing gear is used.

In this fishing gear maintenance cost estimation system, the part which must be replaced can be determined by considering the number of times the fishing gear is used. The amounts of wear of parts depend on the number of times the fishing gear is used. Therefore the part which must be replaced can be determined with improved accuracy by considering the number of times the fishing gear is used.

A fishing gear maintenance cost estimation system according to a sixteenth aspect of the present invention is based on any of the fishing gear maintenance cost estimation systems in the first to fifteenth aspects of the present invention. In this system, the information acceptance component accepts a lot number information indicating a manufacturing lot number for the fishing gear, and the replacement part determination component determines the part which must be replaced on the basis of the manufacturing lot number information.

In this fishing gear maintenance cost estimation system, the part which must be replaced can be determined by considering the manufacturing lot number information about the fishing gear. If a part exists which must be replaced in all fishing gears with a particular manufacturing lot number, the part which must be replaced can be determined with improved accuracy by considering the manufacturing lot number.

A fishing gear maintenance cost estimation program according to a seventeenth aspect of the present invention is a program for enabling a computer to execute information acceptance processing, replacement part determination processing, cost computation processing and display processing. Information acceptance processing is processing for accepting, via a Web page read through the Internet, estimation basis information including product information for identifying a product name of a fishing gear on which maintenance estimation is to be made, and condition information for identifying a condition of the fishing gear. Replacement part determination processing is processing for determining a part which must be replaced on the basis of the estimation basis information. Cost computation processing is processing for computing a cost of maintenance including the cost of the part. Display processing is processing for displaying the cost of maintenance on the Web page.

In this fishing gear maintenance cost estimation program, product information and condition information are accepted via a Web page and a part which must be replaced is determined on the basis of the product information and the condition information. Therefore the part which must be replaced can be predicted with improved accuracy. The cost of maintenance including the cost of the part is computed and displayed on the Web page. In this way, the cost of maintenance can be easily estimated with improved accuracy.

According to the present invention, product information and condition information are accepted via a Web page and a part which must be replaced is determined on the basis of the product information and the condition information. Therefore the part which must be replaced can be predicted with improved accuracy. The cost of maintenance including the cost of the part is computed and displayed on the Web page. In this way, the cost of maintenance can be easily estimated with improved accuracy.

BRIEF DESCRIPTION OF THE DRAWINGS

Referring now to the attached drawings which form a part of this original disclosure:

FIG. 2 is a diagram showing an initial view of a Web page;

FIG. 3 is a diagram showing a list of reel series names;

FIG. 4 is a diagram showing a list of reel product names;

FIG. 5 is a diagram showing a list of condition patterns;

FIG. 6 is a diagram showing a replacement parts association table;

FIG. 7 is a diagram showing an estimate sheet view;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Configuration of System

Figure 1:
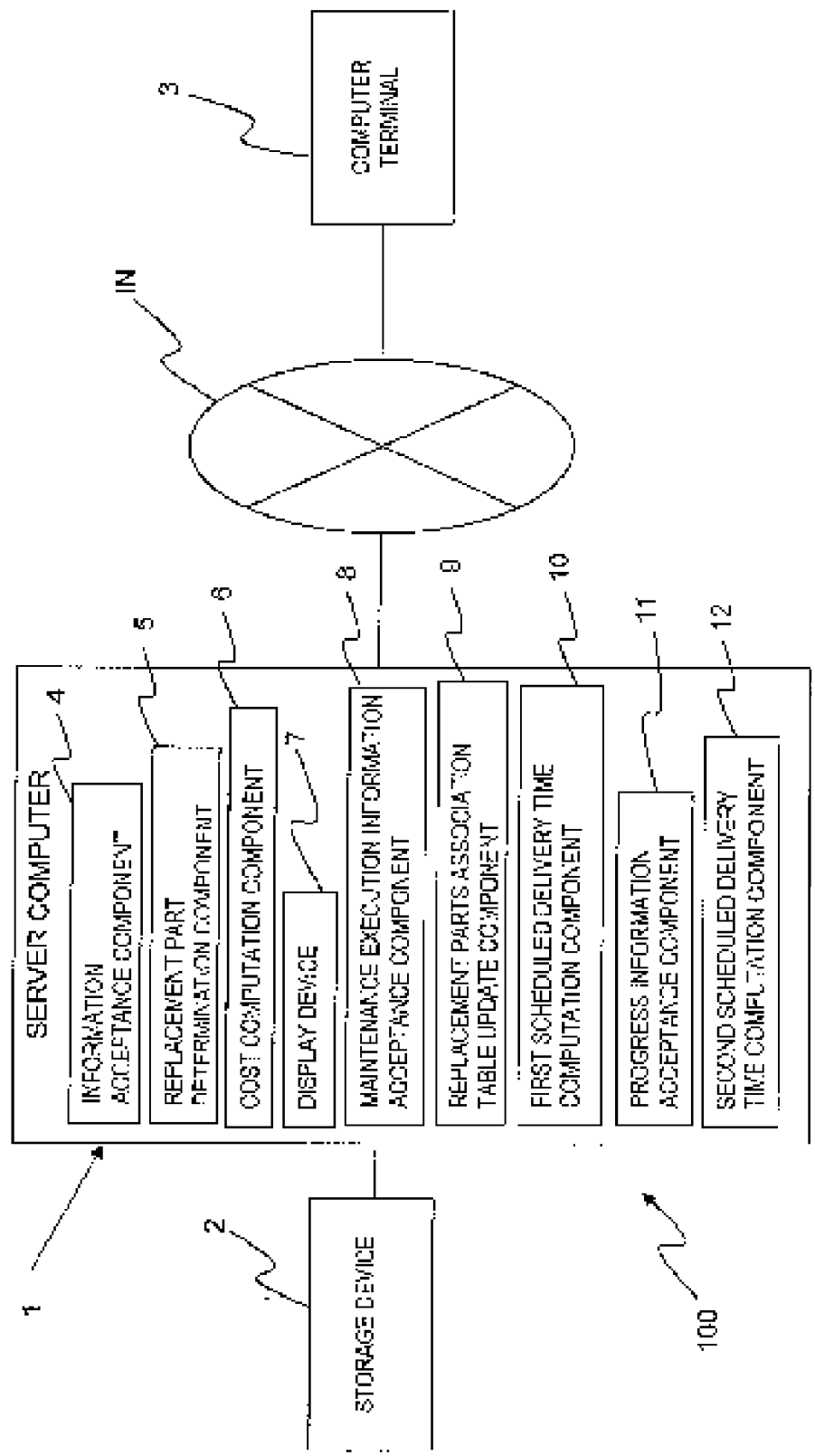
FIG. 1 is a block diagram showing the configuration of a fishing gear maintenance cost estimation system.

Referring initially to FIG. 1, a block diagram showing the configuration of a fishing gear maintenance cost estimation system 100 is illustrated in accordance with a first embodiment of the present invention. The fishing gear maintenance cost estimation system 100 has an overhaul cost estimation function capable of automatically estimating the cost of overhaul of a reel on a Web page displayed on a computer terminal 3 for a user through the Internet IN. The fishing gear maintenance cost estimation system 100 has a server computer 1 and a storage device 2 (a storage component, a first accumulation component, a second accumulation component).

Server Computer

The server computer 1 is a Web server which manages Web pages for overhaul cost estimation. The server computer 1 is connected to the Internet IN. The user's computer terminal 3 can access the server computer 1 via the Internet IN. The storage device 2 is connected to the server computer 1. The storage device 2 stores a maintenance cost estimation program necessary for management of the overhaul cost estimation Web pages and necessary data. The server computer 1 executes the overhaul cost estimation function and other functions by using the maintenance cost estimation program and data stored in the storage device 2. The server computer 1 has an information acceptance component 4, a replacement part determination component 5, a cost computation component 6 and display device 7. The server computer 1 will be referred to as a "server 1" herein and the display device 7 will be referred to as a "display 7" herein for the sake of brevity.

The information acceptance component 4 accepts estimation basis information or the like including product information and condition information through the Web page read through the Internet IN. These sorts of information are input to the user's computer terminal 3 and transmitted to the server 1 via the Internet IN. Web page views shown in FIGS. 2-5, 7, and 9 are displayed on the user's computer terminal 3. Information including estimation basis information is input through these views and accepted by the information acceptance component 4.

FIG. 2 shows a Web page initial view, which includes an explanation display section SC1 and a selection list display section SC2. In the explanation display section SC1, the procedure of operations for executing overhaul estimation is shown. In the selection list display section SC2, a list for identifying a product name of a reel on which overhaul estimation is to be performed is displayed. A reel series name list shown in FIG. 3 is first displayed in the selection list display section SC2. When the user selects by clicking in the (series name) list a series name of a reel for which the user wishes to make an overhaul estimation request, a product name list shown in FIG. 4 is displayed. The product name list contains product names and product codes for products belonging to the selected series. The user selects the product name or product code for the reel on which overhaul estimation is to be performed by clicking the product name or product code. The product name of the reel on which overhaul estimation is to be performed is thereby identified. The information acceptance component 4 accepts as product information the series name and product name of the selected reel and identifies the reel on which overhaul estimation is to be performed.

When the product name of the reel on which overhaul estimation is to be performed is identified, a condition pattern list corresponding to the product is displayed, as shown in FIG. 5. The condition pattern list contains a plurality of condition patterns which indicate possible conditions of the product. For example, the condition pattern list contains conditions such as "Handle cannot be rotated at all" and "Resistance to rotation is felt at/during rotation of handle" as condition patterns. The condition pattern list also contains numbers respectively assigned to the condition patterns. The user can select from these numbers the number assigned to the condition pattern corresponding to the actual condition. Numbers are also assigned to a plurality of combinations of condition patterns as well as the numbers each assigned to one condition pattern. When the user clicks and selects one number, the condition pattern corresponding to the selected number is identified as condition information. For example, if "1" in FIG. 5 is clicked, the condition pattern "Handle cannot be rotated at all" is identified as condition information. The identified condition information is transmitted to the server 1 and accepted, thus identifying the condition of the reel on which overhaul estimation is to be performed.

The replacement part determination component 5 determines a part which must be replaced on the basis of estimation basis information. The replacement part determination component 5 determines a part which must be replaced by referring to a replacement parts association table stored in the storage device 2. Replacement parts association tables are prepared on a product-by-product basis, for example, as shown in FIG. 6. Each replacement parts association table contains product information, condition patterns, replacement part information indicating a part or parts which must be replaced in correspondence with the product information and the condition patterns, and parts price information indicating the cost of replacement of components parts. For example, with respect to a combination of two conditions patterns "6. Rotating condition of line roller is not good. Line twist occurs when line is loaded.", replacement of two arm roller bearings is stored as replacement part information, and a unit price of 600 yen for the arm roller bearing is stored as parts price information. The total amount of money for the parts which must be replaced in correspondence with this condition pattern is 1200 yen. In some case, there is a need to replace parts not limited to one kind. Replacement of a plurality of parts may be required with respect to some condition pattern. For example, with respect to a combination of conditions patterns "5. State of being caught sometimes occurs during rotation of handle. When spool is moved up and down, resistance to rotation is felt at the time of turning at upper or lower end of stroke.", three parts: a cross gear shaft, a gear in a cross gear set and a cross gear pin are stored as replacement part information.

The cost computation component 6 computes an overhaul cost including the cost of parts which must be replaced. The cost computation component 6 computes an overhaul cost by adding together the sum of the prices of parts which must be replaced, a fee for overhaul and, if necessary, a tax.

The display 7 displays a predetermined view such as the above-described initial view on a Web page. The display 7 also displays on a Web page an estimate sheet view shown in FIG. 7. The estimate sheet view contains an overhaul cost and the particulars of the overhaul cost. More specifically, a product name as product information, the names and prices of parts which must be replaced, a fee as overhaul wages, an overhaul cost and an inquiry number are displayed. Also, a condition pattern selected by the user is displayed as the present condition.

Storage Device

The storage device 2 stores information necessary for provision of the overhaul cost estimation service, e.g., the above-mentioned series name list, product name list, replacement parts association table, parts prices and overhaul fees. When estimation of the cost of overhaul is executed, estimation results are accumulated in the storage device 2 together with an inquiry number.

Flow Processing

Figure 8:
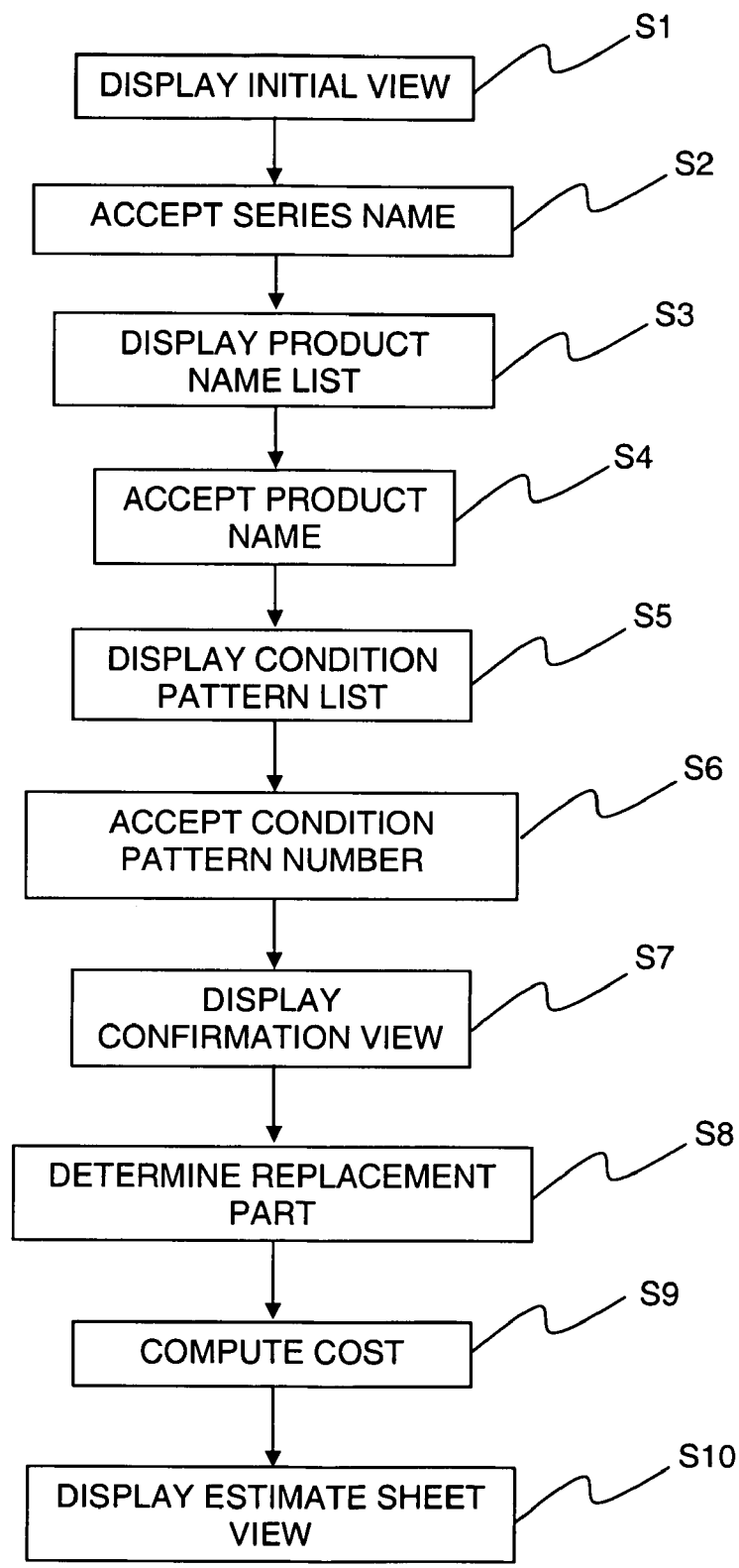
FIG. 8 is a flowchart showing the flow of processing for an overhaul cost estimation function.

The flow of processing for the above-described overhaul cost estimation function will be described with reference to FIG. 8.

In the first step S1, an initial view is displayed. In this embodiment, an initial view for the overhaul cost estimation function is displayed on a Web page. The initial view is thereby displayed on the user's computer terminal 3.

The user selects the desired series name from a series name list in the initial view by clicking, and the series name is accepted in the second step S2. In this embodiment, the selected series name is transmitted from the user's computer terminal 3 to the server 1 and accepted by the server 1.

After acceptance of the selection of the series name, a product name list is displayed in the third step S3. In this embodiment, the product name list corresponding to the selected series name is displayed on a Web page. The product name list is transmitted from the server 1 to the user's computer terminal 3 and displayed on the user's computer terminal 3.

The user selects the desired product name or its product code from the product name list by clicking and the product name is accepted in the fourth step S4 (information acceptance processing). In this embodiment, the selected product name is transmitted from the user's computer terminal 3 to the server 1 and accepted by the server 1.

After acceptance of the selection of the product name, a condition pattern list is displayed in the fifth step S5. In this embodiment, the condition pattern list corresponding to the selected product name is displayed on a Web page. The condition pattern list is thereby displayed on the user's computer terminal 3.

The user selects a predetermined number from the condition pattern list and the condition pattern number is accepted in the sixth step S6. In this embodiment, the number selected by the user in the condition pattern list is transmitted from the user's computer terminal 3 to the server 1 and accepted by the server 1.

Figure 9:
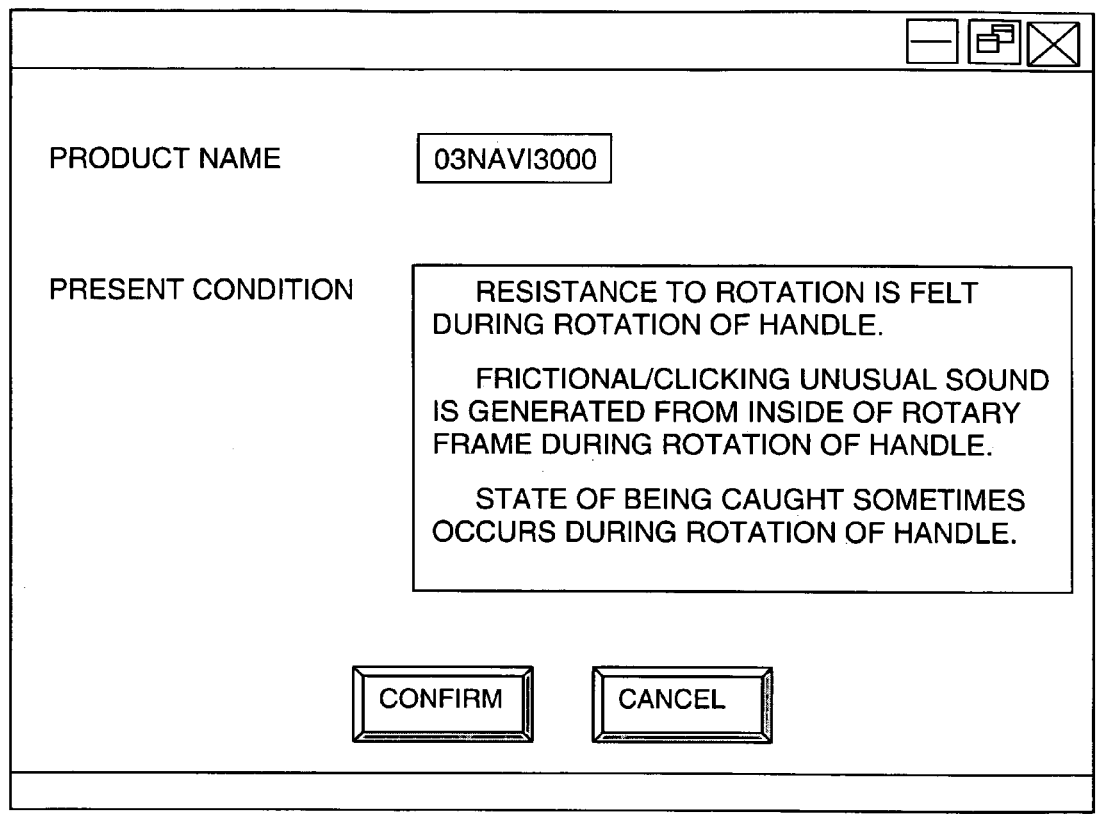
FIG. 9 is a diagram showing a confirmation view.

Thereafter, a confirmation view is displayed in the seventh step S7. In this embodiment, a confirmation view shown in FIG. 9 is displayed on a Web page and is displayed on the user's computer terminal 3. This confirmation view contains the product name and the condition described in the selected condition pattern.

When the user clicks a confirmation button displayed on the confirmation view, determination of a replacement part is made in the eighth step S8 (replacement part determination processing). In the server 1 in this embodiment, the replacement parts association table is referred to and a part which must be replaced is identified and determined on the basis of the identified product name and condition pattern.

In the ninth step S9 (cost computation processing), a cost is computed. In the server 1 in this embodiment, the sum of the prices of parts which must be replaced, a fee for overhaul and a tax are added together and the result of this addition is obtained as an overhaul cost. If there are no parts to be replaced, the sum of the overhaul fee and the tax is computed as an overhaul cost.

In the tenth step S10 (display processing), an estimate sheet view is displayed. In this embodiment, the estimate sheet view shown in FIG. 7 is displayed on a Web page. The estimate sheet view contains an inquiry number, the overhaul cost and the particulars of the overhaul cost. The estimate sheet view is displayed on the user's computer terminal 3. The contents of the estimate sheet view are stored as estimate results in the storage device 2.

The user checks the details of the estimate in the estimate view. If the user wishes to have the reel overhauled, he or she can print the estimate view and use the printed estimate view as an estimate sheet. The user writes on the printed estimate sheet supplementary items such as an upper limit to the amount of money for the overhaul cost, and thereafter hands over the estimate sheet and the reel to the fishing gear distributor. The distributor sends the received reel and estimate sheet to the manufacturer. In the manufacturer facility, the estimate sheet is referred to and the reel is overhauled. When the overhaul is completed, a completion report including the description such as of details of the overhaul, replaced parts and a comment is prepared. The contents of the completion report are stored in the storage device 2 as maintenance execution information described below. The overhauled reel and the completion report are returned to the user by way of the distributor.

Other Functions

The fishing gear maintenance cost estimation system 100 has, in addition to the above-described overhaul cost estimation function, a replacement parts association table update function, a function for inquiry about a scheduled delivery date at the estimation stage, a function for inquiry about a scheduled delivery date after ordering at the distributor, and an optional part selection function. These functions are selectable on a Web page and may be executed along with the above-described overhaul cost estimation function. Each function will be described below in detail.

Replacement Parts Association Table Update Function

The replacement parts association table update function is a function to automatically update the replacement parts association table. As shown in FIG. 1, the server 1 has a maintenance execution information acceptance component 8 and replacement parts association table update component 9.

The maintenance execution information acceptance component 8 accepts maintenance execution information indicating details of executed overhaul. The maintenance execution information includes details of executed overhaul described in a completion report, including information about replaced parts. The maintenance execution information is input by an engineer or the like of the manufacturer, who performed overhaul, and is accumulated in the storage device 2. A maintenance execution number is attached to each of input maintenance execution information groups. The maintenance execution number may be a number attached in the manufacturer facility at the time of execution of overhaul or an acceptance number attached to the order form at the time of undertaking of overhaul by the distributor.

The replacement parts association table update component 9 updates the replacement parts association table on the basis of estimation basis information and maintenance execution information accumulated in the storage device 2. That is, the replacement parts association table update component 9 collates the results of overhaul estimation and maintenance execution information stored in the storage device 2 with each other and improves the expression of the condition pattern so that the expression is adapted to the condition that the user actually wanted to tell. The replacement parts association table update component 9 calls up the corresponding estimation results and maintenance execution information on the basis of the estimation result inquiry number and the maintenance execution number in the maintenance execution information and compares the condition pattern selected by the user and the details of the executed overhaul. The replacement parts association table update component 9 then obtains an optimum expression to improve the reproducibility of the condition expressed by the condition pattern and updates the replacement parts association table. Update of the replacement parts association table is periodically performed and confirmation is made as to whether or not the reproducibility, i.e., the rate of matching between the details of the actually executed overhaul and the condition, has been improved. Not only update of the expression of the existing condition pattern to another expression but also addition of a new condition pattern and deletion of an inappropriate condition pattern may be performed.

Figure 10:
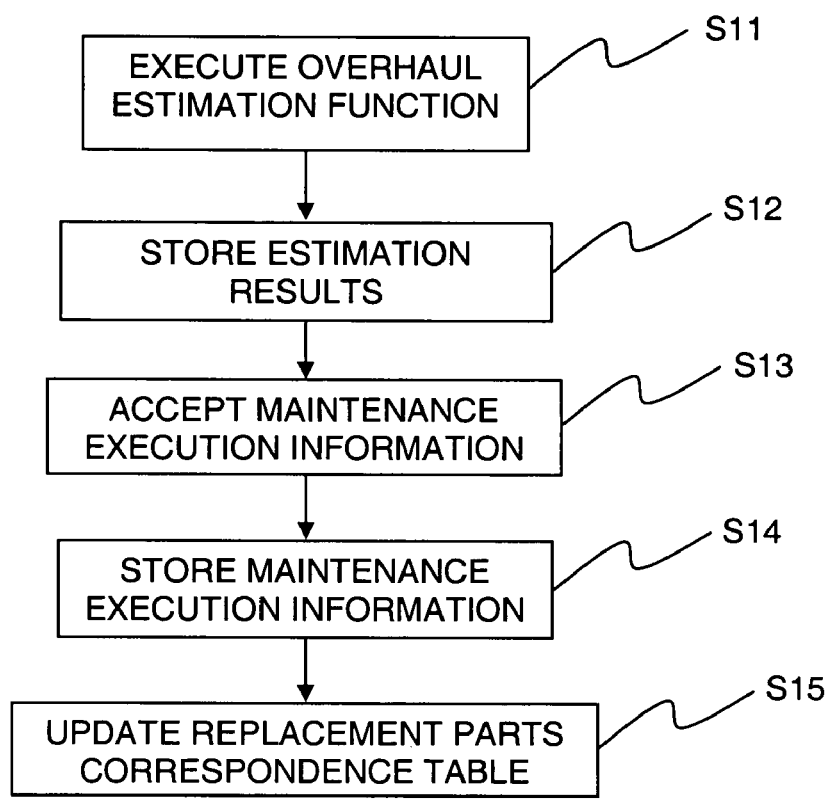
FIG. 10 is a flowchart showing the flow of processing for a replacement parts association table update function.

The replacement parts association table updating function is executed through the flow of processing shown in FIG. 10.

In the eleventh step S11, the overhaul estimation function is executed. In this embodiment, the above-described overhaul estimation function is executed and processing including computation of the cost of overhaul is performed.

In the twelfth step S12, estimation results are stored. In this embodiment, with respect to the event of execution of the overhaul estimation function, estimation results including an inquiry number, an overhaul cost and the particulars of the overhaul cost are stored in the storage device 2.

In the thirteenth step S13, maintenance execution information is accepted. In this embodiment, maintenance execution information obtained by performing overhaul of a reel according to an overhaul order is input through a terminal or the like by an engineer, technician or the like and accepted by the server 1.

In the fourteenth step S14, the maintenance execution information is stored. In this embodiment, the accepted maintenance execution information is stored in the storage device 2 together with a maintenance execution number.

A multiplicity of estimation results and maintenance execution information are accumulated in the storage device 2 by repeating the above-described eleventh to fourteenth steps S11 to S14.

In the fifteenth step S15, the replacement parts association table is updated. In this embodiment, the overhaul estimation results and maintenance execution information accumulated in the storage device 2 are compared with reach other and optimum expressions for improving the reproducibility of the conditions expressed by the condition patterns are obtained, thus updating the replacement parts association table.

The updated replacement parts association table is used from the next execution of the overhaul estimation function.

Function for Inquiry about Scheduled Delivery Date at Estimation Stage

The function for inquiry about a scheduled delivery date at the estimation stage is a function to enable inquiry on a Web page about a scheduled delivery date at the time of the estimation stage in a case where overhaul is ordered.

When the scheduled delivery date inquiry function is executed, the information acceptance component 4 accepts, through a Web page, store information for identifying the distributor to which a reel to be overhauled can be handed over, after determination of parts to be replaced. The store information is the name of the distributor's store to which the reel can be handed over. The store information is input by the user through the computer terminal 3 and transmitted to the server 1.

The server 1 has, as shown in FIG. 1, a first scheduled delivery time computation component 10 for computing a scheduled delivery time for delivery of a reel on the basis of the results of determination by the replacement part determination component 5 and store information. The first scheduled delivery time computation component 10 computes a rough estimate of the number of days required for execution of overhaul of and delivery of the reel to the distributor's store to which the reel has been handed over. In the storage device 2, the store name of the distributor's store where overhaul has been undertaken and information as to whether the distributor's store is a direct-delivery store or an indirect-delivery store. A direct-delivery store is a store from which a reel handed over is directly delivered to the manufacturer, and to which the reel is directly delivered from the manufacturer. An indirect-delivery store is a store from which reels handed over are collectively delivered to the manufacturer periodically at predetermined intervals by a deliverer who makes the rounds to a group of (plurality of) stores, and to which reels are delivered from the manufacturer by the deliverer. With respect to a direct-delivery store, a record of the numbers of days required for direct delivery of reels in the past is stored in the storage device 2. With respect to indirect-delivery stores, a record of store-to-store visit cycles in the past is stored in the storage device 2. The first scheduled delivery time computation component 10 computes scheduled delivery times by referring to this information in addition to the above determinations.

The display 7 displays on a Web page a scheduled delivery time computed by the first scheduled delivery time computation component 10.

Figure 11:
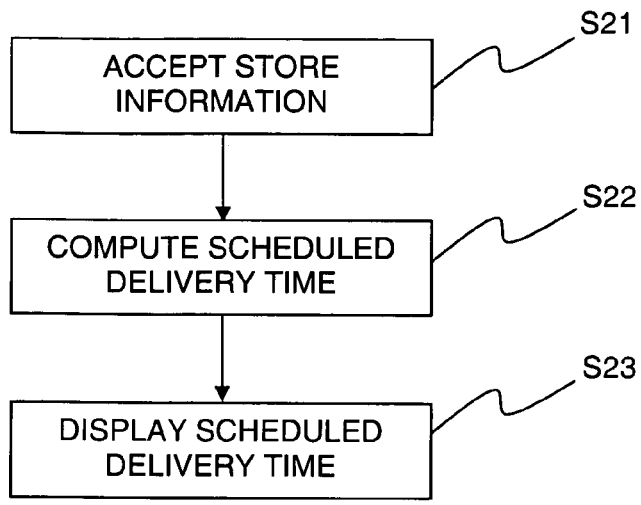
FIG. 11 is a flowchart showing the flow of processing for a function for inquiry about a scheduled delivery date at the estimation stage.

The function for inquiry about a scheduled delivery time at the estimation stage is executed through the flow of processing shown in FIG. 11.

In the twenty-first step S21, store information is accepted. In this embodiment, store information input through a Web page by the user using the computer terminal 3 is transmitted to and accepted by the server 1.

In the twenty-second step S22, a scheduled delivery time is computed. In this embodiment, the first scheduled delivery time computation component 10 computes a scheduled delivery time with respect to a reel on the basis of the results of determination made by the replacement part determination component 5 and the store information in the overhaul cost estimation function.

In the twenty-third step, the scheduled delivery time is displayed. In this embodiment, the display 7 displays on a Web page the scheduled delivery time computed by the first scheduled delivery time computation component 10. The scheduled delivery time is thereby displayed on the user's computer terminal 3.

The function for inquiry about a scheduled delivery time at the estimation stage may be performed when an inquiry number is input and accepted through a Web page after the completion of the above-described overhaul cost estimation, or may be performed in or immediately after the time period during which the processing for the overhaul cost estimation function is performed.

Function for Inquiry about Scheduled Delivery Date after Ordering at Distributor The function for inquiry about a scheduled delivery date after ordering at the distributor is a function to enable inquiry on a Web page about a scheduled delivery date after ordering of overhaul at the distributor.

When the function for inquiry about a scheduled delivery date after ordering at the distributor is executed, the information acceptance component 4 accepts through a Web page an acceptance number assigned to a reel received by the distributor. The acceptance number is a number attached to the order form when overhaul is undertaken in the store. The acceptance number is registered as a reel management number with respect to the overhauled reel and stored in the storage device 2 even after delivery to the manufacturer. When the user inputs the acceptance number through the computer terminal 3, the acceptance number is transmitted to and accepted by the server 1.

The server 1 further has progress information acceptance component 11 and second scheduled delivery time computation component 12.

The progress information acceptance component 11 accepts process information indicating the progress situation of overhaul of a reel. The progress information is input by the manufacturer that performs overhaul. The progress information indicates, for example, a situation in which overhaul is not yet executed, a situation in which the reel is on standby for inspection in a quality control department or a situation in which the reel is being delivered after the completion of overhaul. The progress information is registered and stored in the storage device 2 with respect to each acceptance number. The progress information is updated in response to a change in situation as progress in overhaul.

The second scheduled delivery time computation component 12 computes a scheduled delivery time for delivery of the reel on the basis of the progress information.

The display 7 displays on a Web page a scheduled delivery time computed by the second scheduled delivery time computation component 12 with respect to the reel corresponding to the acceptance number attached by the information acceptance component 4.

Figure 12:
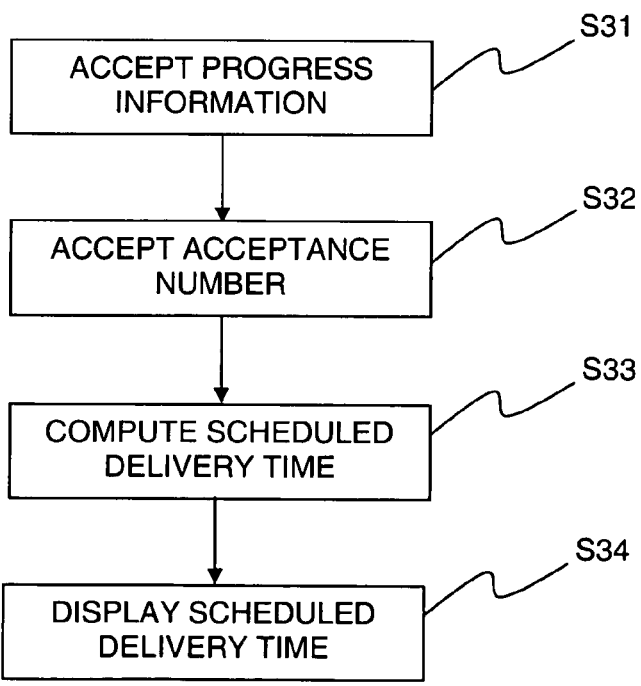
FIG. 12 is a flowchart showing the flow of processing for a function for inquiry about a scheduled delivery date after ordering at a distributor.

The function for inquiry about a scheduled delivery date after ordering at the distributor is executed through the flow of processing shown in FIG. 12.

In the thirty-first step S31, progress information is accepted. In this embodiment, progress information input by a responsible person in the manufacturer using a terminal or the like is accepted by the server 1 and stored in the storage device 2.

In the thirty-second step S32, an acceptance number is accepted. In this embodiment, an acceptance number input through a Web page by the user is transmitted to and accepted by the server 1. This acceptance number is attached to a copy of the order form filled out by the user at the time of ordering of overhaul at the distributor.

When the acceptance number is accepted, a scheduled delivery time is computed in the thirty-third step S33. In this embodiment, the second scheduled delivery time computation component 12 calls up the progress information about the reel corresponding to the accepted acceptance number from the storage device 2 and computes a scheduled delivery time with respect to the reel on the basis of the progress information. At the time, store information may also be referred to, as the method of computing a scheduled delivery time at the estimation stage.

In the thirty-fourth step S34, the scheduled delivery time is displayed. In this embodiment, the display 7 displays on a Web page the scheduled delivery time computed by the second scheduled delivery time computation component 12. The scheduled delivery time is thereby displayed on the user's computer terminal 3.

Optional Part Selection Function

The optional part selection function is a function to enable, at the time of estimation of the cost of overhaul, selection of an optional part according to user's need and estimation of the cost.

For the optional part selection function, the storage device 2 stores the names and prices of optional parts mountable to reels.

The display 7 displays a list of optional parts on a Web page. The list of optional parts selectable by the user is thereby displayed on the user's computer terminal 3. The display 7 displays information as to the existence/nonexistence of a stock of the optional parts as well as the list of optional parts. If some of the optional parts are out of stock, and if they are due to be restocked, the display 7 also displays the scheduled restock date.

The information acceptance component 4 accepts selection of an optional part through a Web page. The user selects an optional part according to his/her need by inputting the name of the optional part or clicking the display of the optional part in the list using the computer terminal 3. The optional part selection result is transmitted to and accepted by the server 1.

The cost computation component 6 computes the cost of overhaul including the cost of the selected optional part, and the display 7 displays the estimate sheet view including the cost of overhaul computed by the cost computation component 6. At this time, if the selected optional part can be used in place of the part determined to be replaced by the replacement part determination component 5, the display 7 displays information indicating that there is a difference between the overhaul cost computed by the cost computation component 6 and including the cost of the optional part and the overhaul cost in the case where the optional part is used in place of the part to be replaced, that is, the cost of the part to be replaced is subtracted since the optional part is used in place of the part to be replaced. In this case, the amount of money after the subtraction may be displayed as the overhaul cost.

Figure 13:
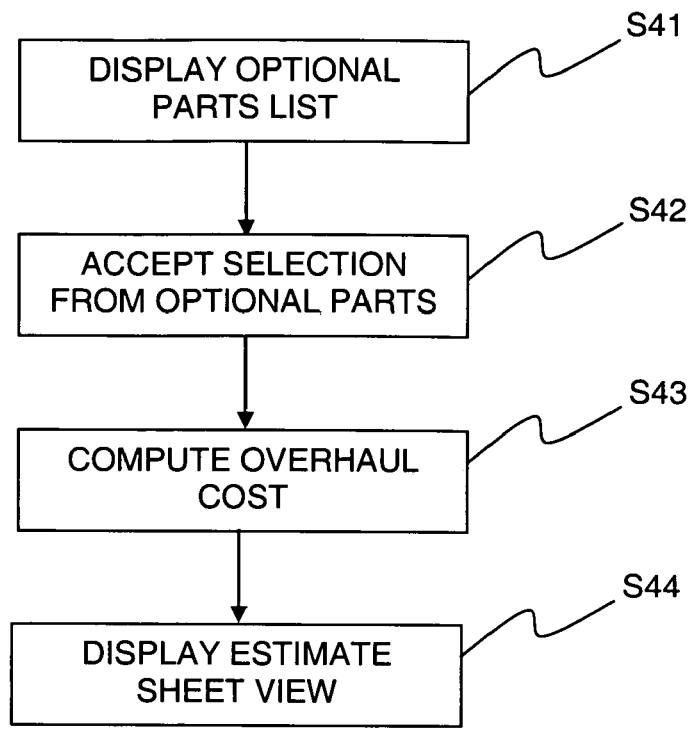
FIG. 13 is a flowchart showing the flow of processing for an optional part selection function.

The above-described optional part selection function is executed through the flow of processing shown in FIG. 13.

In the forty-first step S41, a list of optional parts is displayed. In this embodiment, the display 7 displays a list of optional parts on a Web page. The list of optional parts is thereby displayed on the user's computer terminal 3.

In the forty-second step S42, the selection of an optional part is accepted. In this embodiment, the selection of an optional part made by the user is transmitted from the user's computer terminal 3 to the server 1 to be accepted.

In the forty-third step S43, the cost of overhaul is computed. In this embodiment, the cost computation component 6 computes the cost of overhaul including the cost of the selected optional part. The cost computation component 6 computes the cost of overhaul by performing the same processing as the processing in the eighth step S8 of the above-described overhaul cost estimation function and the processing for computing the amount of money for the optional part.

In the forty-fourth step S44, an estimate sheet view is displayed. In this embodiment, an estimate sheet view including the inquiry number, the overhaul cost and the particulars of the overhaul cost are displayed on a Web page.

Other processing subsequently performed are the same as those in the above-described flow of processing of the overhaul cost estimation function.

Features (1) In the maintenance cost estimation system 100 of this embodiment, it is possible to easily and accurately estimate the cost of overhaul on a Web page. Therefore the user can grasp a rough estimate of the cost of overhaul before actually ordering overhaul and can predict the necessary cost in the case of ordering overhaul. User's anxiety about the possibility of being charged a large amount of money is thereby eliminated. Consequently, customer satisfaction can be improved.

The user can determine an upper limit to the amount of money by referring to the cost of overhaul shown on the estimate sheet when writing the upper limit to the cost of overhaul in the estimate sheet as a supplementary item. Therefore the user can easily set a guide for entering the amount of money as the upper limit and can suitably determine the amount of money.

(2) In the maintenance cost estimation system 100, a manufacturer that executes overhaul can execute overhaul by referring to an estimate sheet printed from a Web page and submitted from a user. Therefore the maintenance cost estimation system 100 ensures that the time period required for overhaul is reduced and overhaul can be speedily performed in contrast with the conventional system in which a manufacturer receives a reel from a user and disassembles and inspects the reel only for estimation and in which, if there is a need to replace a part, a responsible person in the manufacturer sends an estimate sheet to the user for consent to the replacement. The maintenance cost estimation system 100 also ensures that the cost for estimation of the cost of overhaul can be reduced.

(3) Most of "details of faults" entered in order forms by users at ordering of overhaul are vaguely expressed in the conventional procedure. In many cases, therefore, it is not possible to reproduce, at the time of repair, "details of faults" imaged by users. For this reason, it is difficult to ascertain a malfunctioning/fault point.

In the maintenance cost estimation system 100, a user can determine details of a fault by selecting a condition which the user images from expressions of conditions displayed as condition patterns. Therefore a malfunctioning/fault point of the reel can be ascertained more accurately.

(4) It has not been unusual that "details of faults" described on the basis of user's knowledge and experience about reel repairs in general cannot be reproduced after actual inspection and disassembly. Reproduction failure usually occurs in the case of reproduction of reel rotation feelings. However, conditions of faults can vary depending on the magnitude of the load, the rotational speed of the handle or the frequency of occurrence of a malfunction. It is, therefore, important to enable ascertainment of true causes of malfunctions and faults of a reel by preparing suitable examples of conditions described as condition patterns.

The maintenance cost estimation system 100 has the replacement parts association table update function and automatically updates the replacement parts association table by the function to improve the reproduction accuracy. In this way, the time required for repair when overhaul is performed, the repair accuracy and the reliability of the estimate of the cost of overhaul can be improved.

Not only condition pattern expressions but also combinations of parts to be replaced according to the condition pattern may be updated.

(5) The maintenance cost estimation system 100 has the function for inquiry about a scheduled delivery date at the estimation stage. When this function is executed, a scheduled delivery time is displayed on the user's computer terminal 3 to enable the user to grasp the scheduled delivery time at the estimation stage.

A scheduled date for handing over a reel to the distributor may be accepted together with store information and a date for delivery of the handed-over reel to the distributor may be computed and displayed.

(6) The maintenance cost estimation system 100 has the function for inquiry about a scheduled delivery date after ordering at the distributor. When this function is executed, a scheduled delivery date is displayed on the user's computer terminal 3 to enable the user to grasp the scheduled delivery time after ordering at the distributor. This scheduled delivery date is updated with update of overhaul progress information. Therefore the user can grasp the latest scheduled delivery date according to the progress situation of overhaul.

(7) Overhaul of a reel is performed mainly for the purpose of restoring to a state closer to the initial state in terms of performance. However, there is a latent user demand that the manufacturer attach and adjust an optional part as a genuine part that the manufacturer is selling on the market while making a repair.

The maintenance cost estimation system 100 has the optional part selection function. The above-described latent user demand can be met by this function. Estimation of the cost necessary for attachment of an optional part can be simultaneously performed.

Second Embodiment

In the above-described first embodiment, the fishing gear maintenance cost estimation system 100 has the overhaul cost estimation function to estimate the cost necessary for an overhaul process in which disassembly and maintenance operations are performed on a reel. The fishing gear maintenance cost estimation system 100 may also have a failure repair cost estimation function for making repairs of a reel out of order.

When the failure repair cost estimation function is performed, a "failure generation period" selection key and a "manufacturing lot" selection key are displayed on a Web page.

When the user selects a failure generation period through the computer terminal 3, information on the input or selected failure generation period is transmitted to the server 1 and accepted by the information acceptance component 4. The failure generation period is a period during which a reel is used. The storage device 2 stores reel series names, product names of reels, condition patterns and data for enabling computation of an estimate of the cost of failure repair in the failure generation period. For example, the failure generation period is considered in the above-described replacement parts association table. In this embodiment, consideration of the failure generation period enables classification of failures into early failures due to factors in design and manufacture, age deterioration failures relating to a useful life, failures due to exceptional use methods, and the like. This classification is further considered to identify the causes of failures and determine parts to be replaced. The number of times the reel is used may be considered instead of or simultaneously with the failure generation period.

When the user selects a manufacturing lot number through the computer terminal 3, the selected manufacturing lot number is transmitted to the server 1 and accepted by the information acceptance component 4. The replacement part determination component 5 determines a part which must be replaced, by further considering the manufacturing lot number. That is, the manufacturing lot number is further considered in identifying the cause of a failure and determining parts which must be replaced. The storage device 2 also stores charge-free repair part data with respect to manufacturing lot numbers. If the manufacturing lot number of a reel on which estimation is to be made and a part which must be replaced correspond to the charge-free repair part data, the cost computation component 6 subtract the cost of the charge-free repair part from the estimated cost.

Fault generation periods and data on manufacturing lots stored in the storage device 2 may be used independently of each other or may be used in combination.

The other flows of processing are the same as those of the overhaul cost estimation function in the first embodiment.

In the maintenance cost estimation system 100 of this embodiment, the failure generation period and the number of use times are considered to ensure more accurate estimation of the cost of failure repair. In a case where a part exists which must be replaced in all reels assigned a particular manufacturing lot number, the cause of a failure can be identified more easily if the manufacturing lot number is considered. In this way, the facility and accuracy with which the cost of failure repair is estimated can be improved.

It is usually difficult to estimate the cost of failure repair in particular, because it is difficult to determine the cause of a failure in advance. In this maintenance cost estimation system 100, a sufficient number of detailed expressions of conditions are accumulated as condition patterns in the storage device 2 and the replacement parts association table is updated by the above-described replacement parts association table update function, thereby improving the accuracy of determination of the causes of each failure and enabling accurate estimation of the cost of failure repair.

Other Embodiments

In the above-described embodiments, a user who wishes to order overhaul or failure repair orders overhaul or the like at a distributor and hands over a reel to the distributor. However, a direct order to the manufacturer may be made for overhaul or the like. Preferably, in such a case, the display 7 displays on a Web page a table of deliverer freightage determined on an area-by-area basis and a table of cash on delivery fees with respect to charged costs. A user who wishes to make a direct order to a manufacturer for the execution of overhaul or the like by sending the reel to the manufacturer may deliver the reel to the manufacturer by using the cash on delivery system of a deliverer.

In such a case, a freight to be paid on delivery and a cash on delivery fee are required. However, this delivery and payment system is convenient for a user if no fishing gear distributor's store exists in the user's neighborhood, or if the user has no time to go to the distributor during his/her working time for example, and if it is not important for the user to avoid payment of an increased amount of money in comparison with the case of bringing the user's item to the distributor.

Part of the processings executing the above-described functions may be performed by a computer other than the server 1.

While use of one storage device 2 has been described, a plurality of storage devices may alternatively be used by distributing data to be stored to the storage devices.

While in the above-described embodiments the costs of overhaul and failure repair of a reel are estimated, the costs of overhaul and failure repair of a rod, a cooler box and any of other kinds of fishing gears other than a reel may be estimated.

The present invention has the effect of easily and accurately estimating the cost of maintenance and is useful when applied to a fishing gear maintenance cost estimation system and when applied to a fishing gear maintenance cost estimation program.

The server 1 is preferably a computer that includes a microprocessor with a fishing gear maintenance cost estimation program for enabling the computer to execute the fishing gear maintenance cost estimation system of the present invention, as discussed above. The server 1 includes the components 4, 5, 6 and 8-12, as discussed above. The server 1 also includes various other components such as an input interface circuit, an output interface circuit, and storage devices such as a ROM (Read Only Memory) device and a RAM (Random Access Memory) device. It will be apparent to those skilled in the art from this disclosure that the precise structure and algorithms for server 1 can be any combination of hardware and software that will carry out the functions of the present invention. In other words, "component plus function" clauses as utilized in the specification and claims should include any structure or hardware and/or algorithm or software that can be utilized to carry out the function of the "component plus function" clause.

The storage device 2, the computer terminal 3 and the display 7 are conventional computer equipment components that are well known in the art. Since the storage device 2, the computer terminal 3 and the display 7 are well known in the art, these structures will not be discussed or illustrated in detail herein. The components 4, 5, 6 and 8-12 each includes hardware and/or software that is constructed and/or programmed to carry out the desired function.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fishing gear maintenance cost estimation system comprising:
   a server computer configured to be connected to an internet network, the server computer including
      an information acceptance component configured to accept estimation basis information via an Internet Web page, with the estimation basis information including product information in order to identify a product name of a fishing gear on which maintenance estimation is to be performed and actual physical condition information in order to identify an actual physical condition of the fishing gear, and the actual physical condition information being selected from a condition pattern list displayed on the Internet Web Page that includes at least one of the following condition patterns
      handle cannot be rotated at all,
      rotating condition of line roller is not good,
      state of being caught sometimes occurs during rotation of handle,
      when spool is moved up and down, resistance to rotation is felt at the time of turning at upper or lower end of stroke, and
      resistance to rotation is felt at/during rotation of handle;
      a replacement part determination component configured to determine if a part must be replaced based on the estimation basis information;
      a cost computation component configured to compute a cost of maintenance, the cost of maintenance including the cost of the part if the replacement part determination component determines that the part must be replaced based on the estimation basis information; and
      a display device configured to display the cost of maintenance on the Web page.

2. The fishing gear maintenance cost estimation system according to claim 1, wherein
   the display is configured to display on the Web page a list of optional parts mountable to the fishing gear, the information acceptance component is configured to accept a selection from the list of optional parts through the Web page, and the cost computation component is configured to compute the cost of maintenance including cost of the selected optional part.

3. The fishing gear maintenance cost estimation system according to claim 2, wherein
   the display is configured to display information on existence/nonexistence of a stock of the optional parts as well as the list of the optional parts.

4. The fishing gear maintenance cost estimation system according to claim 2, wherein
   the display is configured to display information indicating that there is a difference between the cost of maintenance computed by the cost computation component including the cost of the optional part and an overhaul cost when the optional part is used in place of the part to be replaced if the selected optional part can be used in place of the part determined to be replaced by the replacement part determination component.

5. The fishing gear maintenance cost estimation system according to claim 1, further comprising:
   a storage device configured to store a replacement parts association table containing the product information, the condition patterns and replacement part information indicating the part which must be replaced in correspondence to the condition patterns, wherein
   the replacement part determination component determines the part which must be replaced by referring to the replacement parts association table.

6. The fishing gear maintenance cost estimation system according to claim 5, further comprising:
   a first accumulation component configured to accumulate the estimation basis information;
   a maintenance execution information acceptance component configured to accept maintenance execution information, which indicates details of executed maintenance;
   a second accumulation component configured to accumulate the maintenance execution information; and
   a replacement parts association table update component configured to update the replacement parts association table based on the accumulated estimation basis information and the maintenance execution information.

7. The fishing gear maintenance cost estimation system according to claim 1, further comprising
   a first scheduled delivery time computation component configured to compute a scheduled delivery time for delivery of the fishing gear, wherein
   the information acceptance component accepts, through the Web page, store information for identifying a store to which the fishing gear is handed over to receive maintenance, and
   the first scheduled delivery time computation component is configured to compute the scheduled delivery time based on the part which must be replaced determined by the replacement part determination component and the store information with the display displaying on the Web page the scheduled delivery time computed by the first scheduled delivery time computation component.

8. The fishing gear maintenance cost estimation system according to claim 7, further comprising
   a progress information acceptance component configured to accept progress information indicating the progress of maintenance on the fishing gear; and
   a second scheduled delivery time computation component configured to compute a scheduled delivery time for delivery of the fishing gear based on the progress information, wherein
   the information acceptance component is configured to accept through the Web page an acceptance number assigned to the fishing gear when the fishing gear is handed over to the store to receive maintenance, and
   the display is configured to display on the Web page the scheduled delivery time computed by the second scheduled delivery time computation component with respect to the fishing gear corresponding to the acceptance number accepted by the information acceptance component.

9. The fishing gear maintenance cost estimation system according to claim 1, wherein the display is configured to display on the Web page an estimate sheet view containing the product information, the part which must be replaced, and the cost of maintenance.

10. The fishing gear maintenance cost estimation system according to claim 1, further comprising
   a progress information acceptance component configured to accept progress information indicating the progress of maintenance on the fishing gear; and
   a scheduled delivery time computation component configured to compute a scheduled delivery time for delivery of the fishing gear based on the progress information, wherein
   the information acceptance component is configured to accepts through the Web page an acceptance number assigned to the fishing gear when the fishing gear is handed over to the store to receive maintenance, and
   the display is configured to display on the Web page the scheduled delivery time computed by the scheduled delivery time computation component with respect to the fishing gear corresponding to the acceptance number accepted by the information acceptance component.

11. The fishing gear maintenance cost estimation system according to claim 1, wherein
   the fishing gear comprises a reel.

12. The fishing gear maintenance cost estimation system according to claim 1, wherein
   maintenance estimation is performed for overhaul maintenance of the fishing gear.

13. The fishing gear maintenance cost estimation system according to claim 1, wherein
   maintenance estimation is performed for repair of the fishing gear that is out of order.

14. The fishing gear maintenance cost estimation system according to claim 1, wherein
   the information acceptance component is configured to accept a use period during which the fishing gear has been used, and the replacement part determination component is configured to determine a part which must be replaced based on the use period.

15. The fishing gear maintenance cost estimation system according to claim 1, wherein
   the information acceptance component is configured to accept the number of times the fishing gear is used, and the replacement part determination component is configured to determine a part which must be replaced based on the number of times the fishing gear has been used.

16. The fishing gear maintenance cost estimation system according to claim 1, wherein
   the information acceptance component is configured to accept a manufacturing lot number information indicating a manufacturing lot number for the fishing gear, and the replacement part determination component is configured to determine the part which must be replaced based on the manufacturing lot number information.

17. A computer readable medium configured and arranged to store a fishing gear maintenance cost estimation program, the control program comprising instructions for performing:
   accepting estimation basis information via an Internet Web page with the estimation basis information including product information for identifying a product name of a fishing gear on which maintenance estimation is to be made and actual physical condition information identifying an actual physical condition of the fishing gear, with the actual physical condition information being selected from a condition pattern list displayed on the Internet Web Page that includes at least one of the following condition patterns
   handle cannot be rotated at all,
   rotating condition of line roller is not good,
   state of being caught sometimes occurs during rotation of handle,
   when spool is moved up and down, resistance to rotation is felt at the time of turning at upper or lower end of stroke, and
   resistance to rotation is felt at/during rotation of handle;
   determining if a part which must be replaced on the basis of the estimation basis information;
   computing a cost of maintenance, the cost of maintenance including the cost of the part if it is determined that part must be replaced based on the estimation basis information; and
   displaying the cost of maintenance on the Web page.

* * * * *